United States Patent
Lu (10) Patent No.: US 10,366,230 B2
(45) Date of Patent: Jul. 30, 2019

(54) METHOD AND APPARATUS FOR DISPLAYING INFORMATION

(71) Applicant: ALIBABA GROUP HOLDING LIMITED, George Town, Grand Cayman (KY)

(72) Inventor: Kun Lu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 14/939,796

(22) Filed: Nov. 12, 2015

(65) Prior Publication Data

US 2016/0147994 A1    May 26, 2016

(30) Foreign Application Priority Data

Nov. 20, 2014    (CN) .......................... 2014 1 0670705

(51) Int. Cl.
| | | |
|---|---|---|
| *G06F 7/04* | (2006.01) | |
| *G06F 21/55* | (2013.01) | |
| *H04L 29/06* | (2006.01) | |
| *G06Q 20/32* | (2012.01) | |
| *H04W 12/06* | (2009.01) | |
| *G06F 21/84* | (2013.01) | |
| *G06F 17/30* | (2006.01) | |

(52) U.S. Cl.
CPC ............ *G06F 21/556* (2013.01); *G06F 21/84* (2013.01); *G06Q 20/3274* (2013.01); *H04L 63/04* (2013.01); *H04L 63/0492* (2013.01); *H04L 63/0853* (2013.01); *H04W 12/06* (2013.01); *G06F 2221/032* (2013.01)

(58) Field of Classification Search
CPC .. G06F 21/556; G06F 21/84; G06F 2221/032; H04L 63/04; H04L 63/0492; H04L 63/0853; H04L 63/1408; H04L 63/18
USPC .................. 726/26, 4; 705/67, 400; 713/155
See application file for complete search history.

(56) References Cited

U.S. PATENT DOCUMENTS

| 5,376,945 A | 12/1994 | Takenaka et al. |
|---|---|---|
| 6,738,514 B1 | 5/2004 | Shin et al. |

(Continued)

FOREIGN PATENT DOCUMENTS

| CN | 102651866 A | 8/2012 |
|---|---|---|
| CN | 104065744 A | 9/2014 |

(Continued)

OTHER PUBLICATIONS

PCT International Search Report and Written Opinion dated Mar. 7, 2016, issued in corresponding International Application No. PCT/US2015/060355 (14 pages).

(Continued)

*Primary Examiner* — Gary S Gracia
(74) *Attorney, Agent, or Firm* — Finnegan, Henderson, Farabow, Garrett & Dunner, LLP (57) ABSTRACT

A terminal device for securely displaying information is provided. The terminal device includes a monitoring module configured to monitor a distance between the terminal device and a designated device, a determining module configured to determine whether the distance is less than a preset distance, and a displaying module configured to display the information if the determining module determines that the distance is less than the present distance.

16 Claims, 3 Drawing Sheets

(56) References Cited

U.S. PATENT DOCUMENTS

| | | | |
|---|---|---|---|
| 7,387,250 B2 | 6/2008 | Muni | |
| 8,561,205 B2 | 10/2013 | McCurdy et al. | |
| 8,589,069 B1 | 11/2013 | Lehman | |
| 9,373,112 B1* | 6/2016 | Henderson | G06Q 20/40 |
| 2002/0035697 A1 | 3/2002 | McCurdy et al. | |
| 2004/0203384 A1* | 10/2004 | Sugikawa | H04W 12/06 |
| | | | 455/41.2 |
| 2007/0101366 A1 | 5/2007 | Won et al. | |
| 2007/0194123 A1 | 8/2007 | Frantz et al. | |
| 2007/0293190 A1 | 12/2007 | Ota | |
| 2008/0033835 A1 | 2/2008 | Philyaw | |
| 2008/0082903 A1 | 4/2008 | McCurdy et al. | |
| 2008/0093460 A1 | 4/2008 | Frantz et al. | |
| 2010/0211431 A1* | 8/2010 | Lutnick | G06Q 30/02 |
| | | | 705/14.12 |
| 2011/0099070 A1* | 4/2011 | Eliason | G06Q 30/02 |
| | | | 705/14.58 |
| 2011/0288768 A1 | 11/2011 | Stefani et al. | |
| 2012/0300988 A1* | 11/2012 | Ivanov | G06K 9/00006 |
| | | | 382/115 |
| 2012/0305643 A1* | 12/2012 | Daniels, Jr. | G06Q 50/22 |
| | | | 235/380 |
| 2012/0330743 A1* | 12/2012 | Schul | G06Q 20/20 |
| | | | 705/14.38 |
| 2013/0085968 A1* | 4/2013 | Schultz | G06F 21/32 |
| | | | 705/400 |
| 2013/0131971 A1 | 5/2013 | Parrish et al. | |
| 2013/0246220 A1* | 9/2013 | Hammad | G06Q 30/0639 |
| | | | 705/26.9 |
| 2013/0262857 A1* | 10/2013 | Neuman | H04L 63/08 |
| | | | 713/155 |
| 2014/0020068 A1* | 1/2014 | Desai | H04L 63/10 |
| | | | 726/4 |
| 2014/0101250 A1* | 4/2014 | Dunn | H04L 65/403 |
| | | | 709/204 |
| 2014/0207545 A1* | 7/2014 | Berman | G06Q 30/0222 |
| | | | 705/14.13 |
| 2014/0250245 A1 | 9/2014 | Pahud et al. | |
| 2014/0344161 A1* | 11/2014 | Sato | G06Q 20/105 |
| | | | 705/67 |
| 2015/0154634 A1* | 6/2015 | Chiu | G06Q 30/0253 |
| | | | 705/14.51 |
| 2015/0237026 A1* | 8/2015 | Kumar | G06F 21/31 |
| | | | 726/28 |

FOREIGN PATENT DOCUMENTS

| | | |
|---|---|---|
| EP | 2 493 230 A1 | 8/2012 |
| GB | 2 476 989 A1 | 7/2011 |

OTHER PUBLICATIONS

First Chinese Search Report Issued by the State Intellectual Property Office of People's Republic of China in corresponding Chinese Application No. 201410670705.4, dated Dec. 11, 2017. (1 page).

Second Chinese Office Action Issued by the State Intellectual Property Office of People's Republic of China in corresponding Chinese Application No. 201410670705.4, dated Aug. 2, 2018 (13 pages).

European Patent Office Communication issued for Application No. 15860331.6-1870 which encloses the extended European Search Report which includes pursuant to Rule 62 EPC, the Supplementary European Search Report (Art. 153(7) EPC) and the European search opinion, dated Sep. 29, 2017, 7 pages.

* cited by examiner

METHOD AND APPARATUS FOR DISPLAYING INFORMATION

CROSS-REFERENCE TO RELATED APPLICATION

This application is based upon and claims priority to Chinese Patent Application No. 201410670705.4, filed Nov. 20, 2014, the entire contents of which are incorporated herein by reference.

TECHNICAL FIELD

The present application relates to the field of computer technologies, and in particular, to a method and apparatus for securely displaying information.

BACKGROUND

Along with continuous development of Internet technologies, various terminal devices have become necessary tools in people's daily life. A user often displays various types of information (such as a barcode or a two-dimensional code) via a terminal device, and allows a relevant operation (for example, an operation such as sending contact information according to a two-dimensional code) to be performed according to the displayed information. Before a user allows the operation to be performed, information displayed by the terminal device may be leaked, which reduces the security of user information.

For example, account information such as various social network accounts or game accounts each may correspond to a two-dimensional code. One may acquire account information corresponding to the two-dimensional code displayed by a terminal device by scanning, through a scanning device, the two-dimensional code.

When a user needs to display a two-dimensional code, the two-dimensional code is often displayed directly on a display interface of the terminal device through an Application (App) to which the user logs in. In actual applications, the user often displays the two-dimensional code in advance, so as to wait for a scanning device to approach to the terminal device to scan the two-dimensional code. In this way, in the whole process of waiting for the scanning device to approach, the two-dimensional code may be leaked. Especially when the user is in a crowded and unsafe environment, the two-dimensional code on the terminal device is exposed to the public for a long time, and the two-dimensional code may be easily acquired illegally by people or devices around the terminal device. For example, the two-dimensional code may be easily captured by a candid camera around the terminal device, resulting in user information leakage, thereby reducing the security of the user information.

SUMMARY

The present disclosure provides a terminal device for displaying information. Consistent with some embodiments, the terminal device includes a monitoring module configured to monitor a distance between the terminal device and a designated device, a determining module configured to determine whether the distance is less than a preset distance, and a displaying module configured to display the information if the determining module determines that the distance is less than the preset distance. According to some embodiments, the monitoring module may include one of a laser rangefinder, an ultrasonic rangefinder, or an infrared rangefinder.

Consistent with some other embodiments of the present disclosure, a terminal device for displaying information may include an acquiring module configured to acquiring device information of a designated device, a determining module configured to determining whether the device information matches with device information pre-stored on the terminal device, and a displaying module configured to display the information if the determining module determines that the device information matches with device information pre-stored on the terminal device.

The present disclosure provides a method for displaying information on a terminal device. Consistent with some embodiments, the method for displaying information on a terminal device may include monitoring, by the terminal device, a distance between the terminal device and a designated device, determining, by the terminal device, whether the distance is less than a preset distance, and if yes, displaying the information on the terminal device; otherwise, not displaying the information on the terminal device.

Consistent with some other embodiments of the present disclosure, a method for displaying information on a terminal device may include acquiring device information of a designated device, determining whether the device information matches with device information pre-stored on the terminal device, and if yes, displaying the information on the terminal device; otherwise, not displaying the information on the terminal device.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated herein and constitute a part of this specification, illustrate embodiments consistent with the present disclosure and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatus and methods consistent with aspects related to the invention as recited in the appended claims.

Consistent with some embodiments of this disclosure, a method and apparatus for securely displaying information are provided. With the disclosed method and apparatus, a user, while in a public environment, only needs to display the information when it is needed. The information does not need to be displayed for a relatively long period, which may result in information leakage.

Consistent with some embodiments of the present disclosure, before a terminal device displays information, the terminal device monitors the circumstance or environment around the terminal device to determine whether it meets a preset condition. For example, the terminal device may monitor a distance between the terminal device itself and a designated device for scanning information from the terminal device. Alternatively, the terminal device may collect device information of the designated device and determine whether the device information matches with pre-stored device information. If the distance is within a preset condition in the first example, or if the designated device matches pre-stored device information in the second example, the terminal device may determine that the current environment meets the preset condition, and displays the information. Otherwise, the terminal device may determine that the current environment does not meet the preset condition, and decide not to display the information. By this way, the time of presenting the information in the public environment may be effectively shortened, thereby improving the security of the user information.

To make the objectives, technical solutions and advantages of the present application clearer, the technical solutions of the present application are described clearly and completely through specific embodiments and corresponding accompanying drawings of the present application. Apparently, the embodiments in the following description are merely a part of embodiments of the present invention, instead of all embodiments. On the basis of the embodiments in the present application, all other embodiments derived by a person of ordinary skill in the art without creative efforts shall fall within the protection scope of the present application.

The method for displaying information provided in the embodiments of the present application is described in detail as follows.

Figure 1:
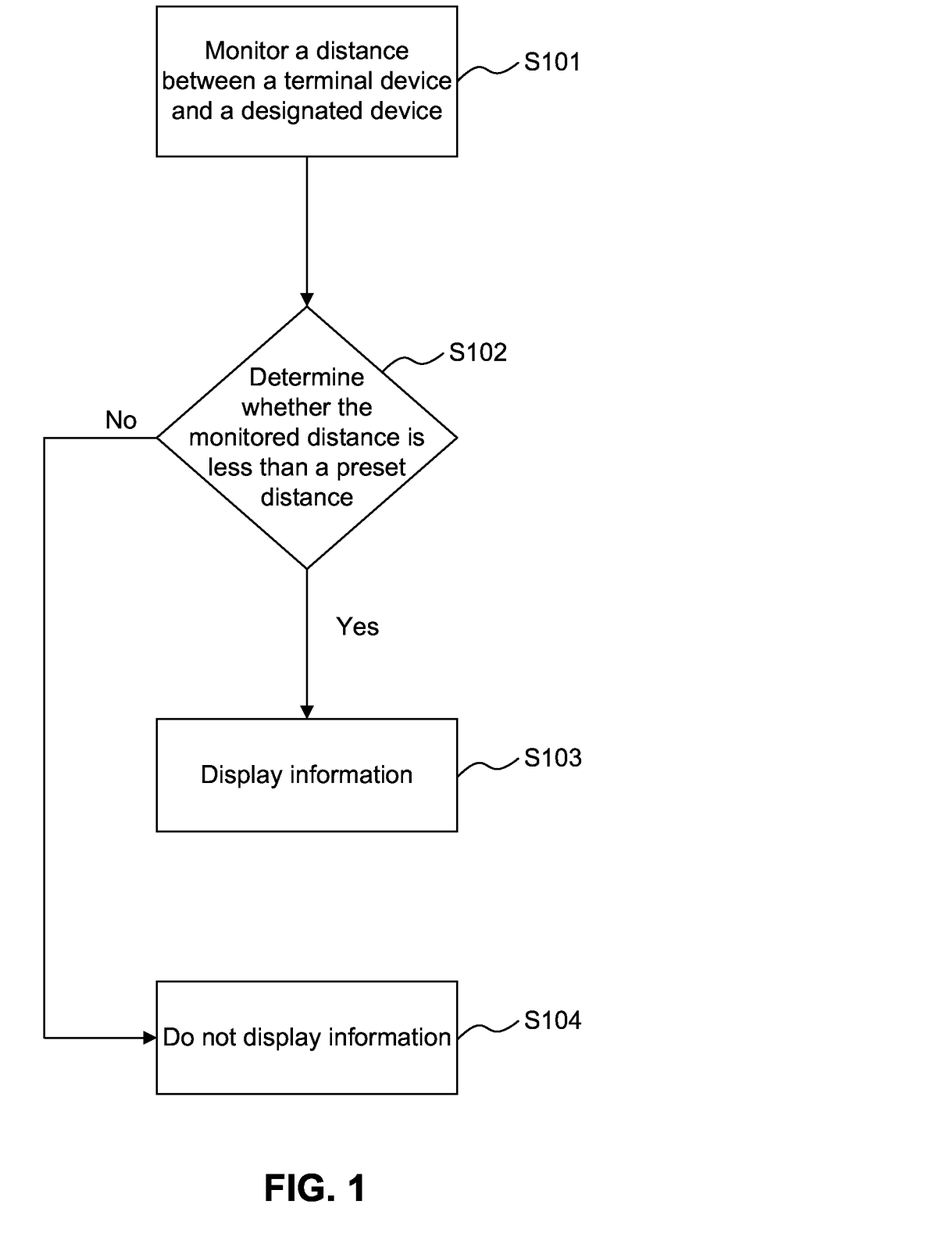
FIG. 1 is a flowchart of an exemplary method for displaying information on a terminal device, consistent with some embodiments of the present disclosure.

FIG. 1 shows a schematic flow chart of a method for displaying information according to an embodiment of the present application. The method may include the following steps.

S101: monitor a distance between a terminal device and a designated device.

In one embodiment, the information to be displayed by the terminal device may be a two-dimensional code, which may represent account information, corresponding to a user's social network account or other information. The terminal device may be a mobile device (such as a mobile phone, tablet, or watch) or a computer with a display. The designated device may be another terminal device for receiving or capturing the two-dimensional code by, e.g., scanning the two-dimensional code. The designated device may be a scanner or a camera, or other electronic devices such as a mobile phone or a computer equipped with a scanner or camera. For example, the information that needs to be displayed may be a barcode corresponding to a payment account, and the designated device may be a scanning device capable of scanning the barcode (for example, a barcode-scanning gun).

For example, assuming that a user needs to display a two-dimensional code corresponding to a social network account via a social App on a first terminal device to a second terminal device, the user may trigger, in the logged-in social App, the first terminal device to start a two-dimensional code display function. After the first terminal device starts the two-dimensional code display function, the first terminal device may send prompt information to the user, so as to prompt the user to move the first terminal device close to the second terminal device. The first terminal device may start a monitoring module to monitor a distance L between the first terminal device and the second terminal device. The monitoring module may include a laser rangefinder, an ultrasonic rangefinder, an infrared rangefinder, or other devices that can detect a distance between two objects.

According to some embodiments, the monitoring module (for example, an infrared rangefinder) used for measuring a distance may be integrated with the first terminal device. In some other embodiments, the monitoring module may be mounted on the first terminal device. The monitoring may be continuous until the monitored distance is less than a preset distance as discussed in detail below or instructed to stop by the user.

S102: determine whether the monitored distance L is less than a preset distance L', and if yes, perform step S103; otherwise, perform step S104.

Still using the above example, in the embodiment of the present application, the distance L' may be preset in the first terminal device by the user. For example, it can be preset to be 10 cm. The first terminal device may determine that the distance L between the first terminal device and the second terminal device is, for example, 5 cm. The first terminal device then compares the distance L with the preset distance L', and determines that the monitored distance L is less than the preset distance L'. The first terminal device may then determine that the second terminal device close to the first terminal device, and a relevant operation can be performed at the moment.

For another example, the first terminal device may determine that the distance L between the first terminal device and the second terminal device is 30 cm. The first terminal device compares the monitored distance L with the preset distance L' and determines that the monitored distance L is greater than the preset distance L'. The first terminal device may then determine that the second terminal device is not close to the first terminal device, and the relevant operation cannot be performed at the moment.

In some embodiments, the comparison between the monitored distance L and the preset distance L' may be performed by the social App on the first terminal device. In some embodiments, the monitoring module on the first terminal device that monitors the distance L between the first terminal device and the second terminal device may be configured to transmit the distance L to the social App, and the social App, when receiving the distance L from the monitoring module, compares the distance L with the preset distance L' and determines whether the monitored distance L is less than the preset distance L'.

The monitoring module may be registered with the social App in advance. Thus, when the first terminal device monitors a current environment by using the social App, the first terminal device may receive the distance L from the registered monitoring module. In this way, the social App may determine that the distance L sent by the registered monitoring module is credible.

S103: display information.

Still using the above example, when the first terminal device determines, through step S102, that the second terminal device is close to the first terminal device (i.e., the monitored distance is less than the preset distance), the first terminal device may display the two-dimensional code. In some embodiments, the terminal device may display the two-dimensional code that was in a hidden state on a display screen, for the second terminal device to scan.

S104: do not display information.

Still using the above example, when the first terminal device determines, through step S102, that the second terminal device is not close to the first terminal device (i.e., the monitored distance is greater than the preset distance), the first terminal device will not display the two-dimensional code.

In the method shown in FIG. 1, before a terminal device displays information, by monitoring a distance between the terminal device and a designated device, the terminal device determines whether a current environment meets a preset condition, and if yes, the terminal device displays the information; otherwise, the terminal device will not display the information. In actual applications, the time for the designated device approaching to the terminal device (or the terminal device approaching the designated device) and acquiring information is short. The waiting time of the user (e.g., waiting in line) may be long. During the waiting time, if the information is displayed on the terminal device, it may be seen or captured by a third party. In the present disclosure, the terminal device monitors to see whether the designated device is close to the terminal device, and displays the information only when the designated device is close to the terminal device. The information is not displayed during a waiting stage, and therefore, the time of presenting the information to the public is shortened, thereby effectively reducing the probability of any information leakage, and improving the security of user information.

For example, when the user may display a payment graphic identifier (for example, a barcode or a two-dimensional code) corresponding to a payment deduction mechanism (for example, a payment account) to another party, after the designated device scans the payment graphic identifier, a deduction operation may be performed directly without the need of authentication. For the user, if the payment graphic identifier is leaked before the designated device scans the payment graphic identifier, the user may suffer economic losses. Therefore, it is important to improve the security of the payment graphic identifier corresponding to the payment account. The following embodiment uses this payment scenario as an example.

First, the terminal device monitors a distance between the terminal device and the designated device. For example, when the user checks out at a checkstand of a physical store, the user may display a barcode (that is, the payment graphic identifier) to the cashier, and the cashier may scan the barcode by using a scanning device (the designated device), acquire a payment account corresponding to the barcode, and send to a payment server a request of deducting money from the payment account, so as to perform a check-out deduction operation.

In some embodiments, before the user displays the barcode to the cashier, the user may log in to a log-in account of a payment App on a terminal device (such as a mobile phone or a mobile computer), and trigger, by using the payment App, the terminal device to start a barcode display function. After the terminal device starts the barcode display function, prompt information may be sent to the user first, so as to prompt the user to move the terminal device close to the scanning device. Then, the terminal device may start a monitoring module to monitor a distance between the terminal device and the scanning device.

Then, the terminal device determines whether the monitored distance is less than a preset distance, and if yes, the terminal device displays the barcode; otherwise, the terminal device will not display the barcode.

In this way, when the user is waiting for the scanning device to scan the barcode, the terminal device does not display the barcode to the public, and the terminal device displays the barcode only when the scanning device is close to the terminal device; therefore, the time of presenting the barcode to the public may be shortened, thereby effectively reducing the probability of barcode leakage, and further improving the security of the barcode.

Figure 2:
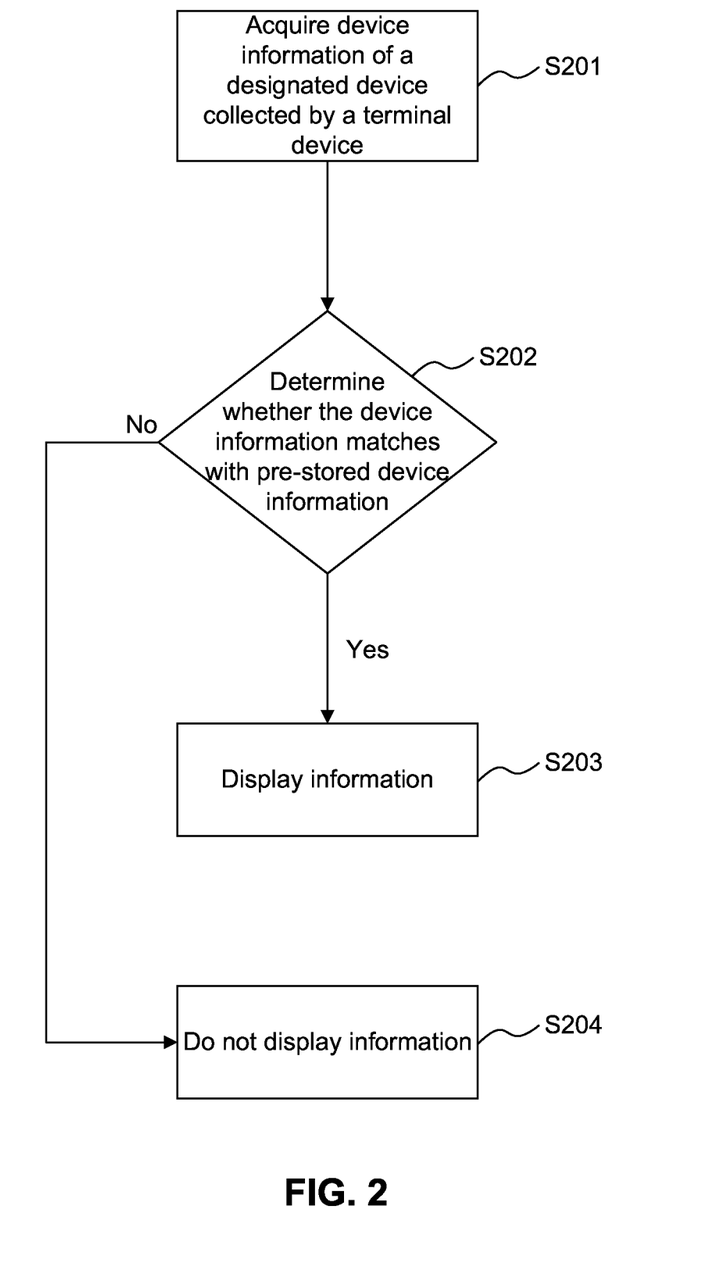
FIG. 2 is a flowchart of another exemplary method for displaying information, consistent with some embodiments of the present disclosure.

The present disclosure further provides another exemplary method for displaying information, as shown in FIG. 2. Referring to FIG. 2, according to some embodiments, the exemplary method may include the following steps.

S201: acquire device information of a designated device collected by a terminal device.

A scenario of a user checking out at a checkstand of a physical store by using a terminal device is used as an example for illustration. In this example, information displayed by the terminal device is a payment graphic identifier, and specifically, the payment graphic identifier may a barcode. The designated device may be a scanning device, and the device information of the designated device may be a scanning device type, for example, a model of the scanning device.

When requested to display the barcode, the terminal device may acquire the scanning device type collected by the terminal device.

Scanning devices generally have different appearances corresponding to different scanning device types. In some embodiments, the terminal device may acquire an image of the scanning device collected by the terminal device, and identify a scanning device type based on the image. The terminal device may pre-store multiple scanning device types and multiple appearance images of scanning devices corresponding to each scanning device type. For example, for a scanning device type A, the terminal device may store appearance images of a scanning device corresponding to the scanning device type A at multiple angles, so as to be used as pre-stored appearance images.

The terminal device may collect an appearance image of the scanning device on the checkstand by using a camera of the terminal device, use the appearance image as a current appearance image, and compare the current appearance image with pre-stored appearance images. Among the pre-stored appearance images, if there is a pre-stored appearance image matching with the current appearance image, a scanning device type corresponding to the pre-stored appearance image may be searched for, and the terminal device uses the found scanning device type as an identified scanning device type.

S202: determine whether the device information (e.g., device type) matches with pre-stored device information, and if yes, perform step S203; otherwise, perform step S204.

Still using the above example, in order that the barcode displayed by the terminal device is only scanned by a credible scanning device, device information of the scanning device may be pre-registered with a payment App on the terminal device. The pre-registration information can be used as the pre-stored device information. When the terminal device determines that the device information collected at step S201 matches with the pre-stored device information, the terminal device may determine that the scanning device is credible.

In the above example, after the terminal device identifies the scanning device type, the terminal device may compare the scanning device type with pre-stored scanning device types. If a pre-stored scanning device type matches with the identified scanning device type, the terminal device determines that the device information of the scanning device matches with the pre-stored device information, the scanning device is a credible scanning device, and the barcode can be displayed; otherwise, the terminal device determines that the device information of the scanning device does not match with the pre-stored device information, the scanning device is an incredible scanning device, and the barcode will not be displayed.

S203: display information.

When determining that the device information of the scanning device matches with the pre-stored device information, the terminal device may display the barcode.

S204: do not display information.

When determining that the device information of the scanning device does not match with the pre-stored device information, the terminal device will not display the barcode.

In this way, when the scanning device is close to the terminal device, the terminal device determines, according to a scanning device type of the scanning device collected by the terminal device, whether the current scanning device is a credible scanning device, and displays the barcode only when the terminal device determines that the current scanning device is a credible scanning device. The time of presenting the information to the public may be greatly reduced, and the probability that the barcode is acquired by an incredible scanning device is effectively reduced, thereby improving the security of user information.

In the method for displaying information shown in FIG. 1 of the present disclosure, the terminal device determines whether to display the information by monitoring the distance between the terminal device and the designated device. The terminal device may not be able to determine whether a device close to it is a legally designated device, and if the device close to the terminal device is an illegal device (for example, a device for stealing information), and a distance between the illegal device and the terminal device is within the preset distance, the terminal device will display the information, and this may result in leakage of the displayed information.

To avoid information leakage, in some other embodiments, a terminal device may first monitor a distance between the terminal device and a designated device, so as to determine whether the distance is less than a preset distance. When the distance is less than the preset distance, the terminal device further acquires device information of the designated device collected by the terminal device. The terminal device then determines whether the device information matches with pre-stored device information. If the device information matches with pre-stored device information, the terminal device displays the information; if they do not match, the terminal device will not display the information. The process for the terminal device acquiring the device information of the designated device collected by the terminal device is similar to the process described in conjunction with FIG. 2, and it is not repeated herein. In the step of monitoring the device, if the distance is not less than the preset distance, the terminal device will not display the information.

Alternatively, the terminal device may first obtain the designated device information and determines whether device information matches with pre-stored device information. If the terminal device determines the device information matches with the pre-stored device information, the terminal device may start the monitoring module to monitor the distance between the terminal device and the designated device, and if the monitored distance is less than the preset distance, the terminal device displays the information.

In this way, the terminal device displays the information only when it is determined that the distance between the terminal device and the designated device is within the preset distance and that the device information of the designated device matches with the pre-stored device information. These exemplary methods are illustrated by the combination of FIGS. 1 and 2. The methods further reduce the probability of leakage of user information and improve the security of the user information.

As described above, the present disclosure provides exemplary methods for securely displaying information. The present disclosure also provides exemplary apparatus and systems, as shown in FIG. 3 and FIG. 4, for implementing the methods described above.

Figure 3:
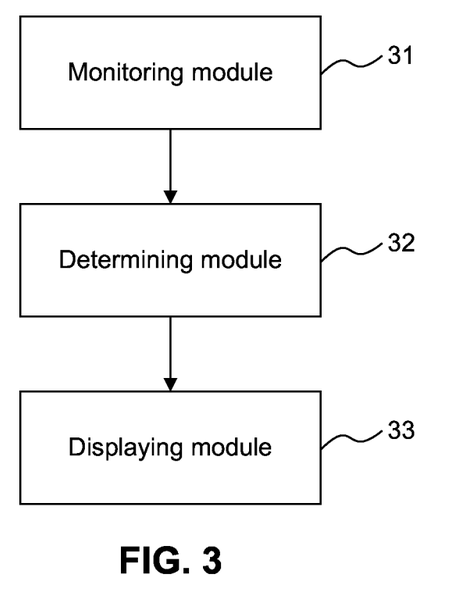
FIG. 3 is a block diagram of an exemplary device for displaying information, consistent with some embodiments of this disclosure.

FIG. 3 shows an apparatus for securely displaying information according to an embodiment of the present disclosure. The apparatus may include a monitoring module 31, a determining module 32, and a displaying module 33. According to some embodiments, the monitoring module is configured to monitor a distance between itself and a designated device. As discussed above, the monitoring module 31 may include a laser rangefinder, an ultrasonic rangefinder, an infrared rangefinder, or the like. The determining module 32, e.g., implemented by a processor with software, is configured to determine whether the distance is less than a preset distance. The displaying module 33, e.g., implemented by the processor with software and a screen, is configured to display information when the distance is less than the preset distance, and not to display information when the distance is greater than the preset distance. The information to be displayed may be any information that a user would like to protect, for example, a payment graphic identifier, as discussed above.

Figure 4:
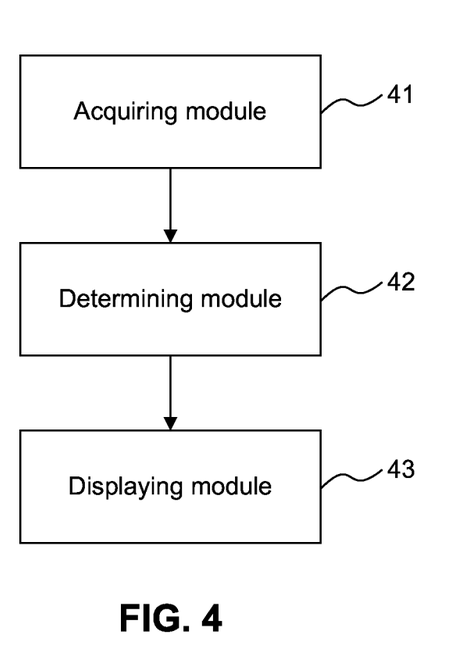
FIG. 4 is a block diagram of another exemplary device for displaying information, consistent with some embodiments of this disclosure.

FIG. 4 shows an apparatus for displaying information according to another embodiment of the present disclosure. The apparatus may include an acquiring module 41, a determining module 42, and a displaying module 43. The acquiring module 41 is configured to acquire device information of a designated device collected by the acquiring module 41 or the terminal device. For example, as discussed above, the acquiring module 41 may include a camera for capturing an image of the designated device. The determining module 42, e.g., implemented by a processor with software, is configured to determine whether the device information matches with the pre-stored device information. The displaying module 43, e.g., implemented by a processor with software and a screen, is configured to display information when the device information matches with the pre-stored device information, and not to display information when the device information does not match with the pre-stored device information. The terminal device may further include memory for storing the pre-stored device information. The information to be displayed may include any information that the user would like to protect, for example, a payment graphic identifier, as discussed above.

In some embodiments, the designated device includes a scanning device, as discussed above. In some embodiments, the acquiring module 41 may be configured to acquire an image of the scanning device collected by the acquiring module 41, and identify a scanning device type from the image.

In view of the above, in the method and apparatus for displaying information according to the embodiments of the present disclosure, before a designated device acquires information from a user's terminal device, the terminal device may monitor a distance between the terminal device and the designated device, so as to determine whether the designated device is close to the terminal device. If yes, the terminal device may display the information; otherwise, the terminal device will not display the information. Thus, the information will not be displayed when the designated device is not close and not ready to acquire information from the terminal device. The time of presenting the information to the public is shortened, thereby reducing the probability of a third party stealing the user information, and improving the security of user information.

Further, in a common barcode example, before the terminal device displays a barcode, the terminal device may determine, according to a scanning device type of a scanning device collected by the terminal device, whether a current scanning device is a credible scanning device, and display the barcode only when the terminal device determines that the current scanning device is a credible scanning device. In this way, the security of user information may be further improved.

A person having ordinary skill in the art should understand that embodiments of the present application may be provided as method, system or computer program products. The invention may be in the form of a hardware embodiment, a software embodiment, or a combined hardware and software embodiment. Moreover, the invention may be in the form of a computer program product implemented on a non-transitory computer-readable memory medium (including, but not limited to, disk memory, CD-ROM, and optical memory) comprising computer executable program codes.

The present application is described with reference to the flowchart and/or block diagram of the method, device (system) and computer program product according to the embodiments of the present application. It should be understood that the flow and/or block in the flowchart and/or block diagram, and the combination of a flow and/or block in the flowchart and/or block diagram can be implemented by computer program commands. Such computer program commands can be provided to a processor of a general computer, a dedicated computer, an embedded processing unit or other programmable data processing devices to produce a machine, so that the commands executed by the processor of the computer or the other programmable data processing devices produce an apparatus used for implementing functions specified in one or more flows in the flowchart and/or one or more blocks in the block diagram.

These computer program commands may also be stored in a non-transitory computer-readable memory capable of guiding a computer or other programmable data processing devices to function in a specified mode. The commands stored in the computer-readable memory generate a product with the commands for implementing the functions specified in one or more flows in the flowchart and/or one or more blocks in the block diagram.

These computer program commands may also be loaded in a computer or other programmable data processing devices. The commands when executed on the computer or other programmable data processing devices provide the steps for implementing the functions specified in one or more flows in the flowchart and/or one or more blocks in the block diagram.

According to a typical configuration, a computing device for implementing the disclosed methods and apparatus may include one or more processors (CPUs), an input/output interface, a network port, and a memory. In some exemplary embodiments, the memory may include a non-transitory computer-readable storage medium including instructions, which when executed by the computer, perform the above-described methods. In some exemplary embodiments, the computer device may be a mobile device, such as a mobile phone or a watch.

The memory may include a volatile memory, a Random Access Memory (RAM) and/or a non-volatile memory (NVM), such as a Read Only Memory (ROM) or a flash RAM. The memory is an example of computer-readable media. Specific examples of computer-readable media may include, but are not limited to, Phase Change Random Access Memory (PRAM), Static Random Access Memory (SRAM), Dynamic Random Access Memory (DRAM), and other types of RAM, Read-Only Memory (ROM), Electrically Erasable Programmable Read-Only Memory (EEPROM), flash memory, or other internal memory, Compact Disc Read-Only Memory (CD-ROM), Digital Versatile Disc (DVD) or other optical storage means, magnetic tape cassettes, magnetic tapes or magnetic discs, or other magnetic storage devices, or any other non-transmission media that can be used for storing information that can be accessed by computing devices. As defined herein, the computer-readable media do not include computer-readable transitory media, e.g., modulated data signals and signal carriers.

It should be noted that the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open-ended, in that an item or items following any one of these words is not meant to be an exhaustive listing of such item or items, or meant to be limited to only the listed item or items.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A terminal device for securely displaying information to a designated device, comprising:

a monitoring module configured to monitor a distance between the terminal device and the designated device by measuring the distance between the terminal device and the designated device;

a determining module configured to determine whether the monitored distance is less than a preset distance by comparing the monitored distance with the preset distance; and a displaying module configured to display the information for scanning by the designated device if the determining module determines that the monitored distance is less than the preset distance and configured to decline to display the information if the determining module determines that the monitored distance is greater than the preset distance, wherein the monitoring module, the determining module, and the display module are coupled to or executed by a hardware processor within the terminal device, and wherein the displayed information comprises a payment graphic identifier representing a payment account.

2. The terminal device according to claim 1, wherein the monitoring module includes one of a laser rangefinder, an ultrasonic rangefinder, or an infrared rangefinder for monitoring a distance between the terminal device and a designated device.

3. The terminal device according to claim 1, wherein the payment graphic identifier comprises a barcode.

4. The terminal device according to claim 1, wherein the payment graphic identifier comprises a two-dimensional code.

5. A terminal device for securely displaying information for scanning by a designated device, comprising:

an acquiring module including a camera for capturing an image of the designated device;

a memory configured to store first information, the first information being pre-stored in the memory and including one or more images showing the designated device;

a determining module configured to determine whether the captured image matches with any of the one or more images by comparing the captured image with the one or more images; and a displaying module configured to display second information to the designated device for scanning by a designated device if the determining module determines that the captured image matches with at least one of the one or more images and configured to decline to display the second information if the determining module determines that the captured image does not match with any of the one or more images, wherein the acquiring module, the determining module, and the displaying module are coupled to or executed by a hardware processor within the terminal device, and wherein the displayed information comprises a payment graphic identifier representing a payment account.

6. The terminal device according to claim 5, wherein the designated device comprises a scanning device; and the acquiring module is configured to identify a scanning device type based on the captured image if the determining module determines that the captured image matches with at least one of the one or more images of the pre-stored first information.

7. A method for securely displaying information on a terminal device, comprising:

starting, by the terminal device, an information display function for displaying the information to a designated device;

monitoring, by the terminal device, a distance between the terminal device and the designated device by measuring the distance between the terminal device and the designated device;

determining, by the terminal device, whether the monitored distance is less than a preset distance by comparing the monitored distance with the preset distance;

after starting the information display function, displaying on the terminal device the information for scanning by the designated device in response to a determination that the monitored distance is less than the preset distance; and after starting the information display function, declining to display the information on the terminal device in response to a determination that the monitored distance is greater than the preset distance, wherein the displayed information comprises a payment graphic identifier representing a payment account.

8. The method according to claim 7, wherein the payment graphic identifier comprises a barcode.

9. The method according to claim 7, wherein the payment graphic identifier comprises a two-dimensional code.

10. A non-transitory computer-readable storage medium that stores a set of instructions that is executable by at least one processor of a terminal device to cause the terminal device to perform a method for securely displaying information to a designated device, the method comprising:

monitoring, by the terminal device, a distance between the terminal device and the designated device by measuring the distance between the terminal device and the designated device;

determining, by the terminal device, whether the monitored distance is less than a preset distance by comparing the monitored distance with the preset distance;

displaying on the terminal device the information for scanning by the designated device in response to a determination that the monitored distance is less than the preset distance; and declining to display the information on the terminal device in response to a determination that the monitored distance is greater than the preset distance, wherein the displayed information comprises a payment graphic identifier representing a payment account.

11. The non-transitory computer-readable storage medium of claim 10, wherein the payment graphic identifier comprises a barcode.

12. The non-transitory computer-readable storage medium of claim 10, wherein the payment graphic identifier comprises a two-dimensional code.

13. A non-transitory computer-readable storage medium that stores a set of instructions that is executable by at least one processor of a terminal device to cause the terminal device to perform a method for securely displaying information for scanning by a designated device, the method comprising:

capturing, by the terminal device, a first image of the designated device; storing, on the terminal device, a second image showing the designated device before the first image is captured;

determining whether the first image matches with the second image stored on the terminal device by comparing the first image with the second image;

displaying the information on the terminal device for scanning by the designated device if the first image is determined to match with the second image; and declining to display the information on the terminal device if the first image is determined to not match with the second image;

wherein the displayed information comprises a payment graphic identifier representing a payment account.

14. The non-transitory computer-readable storage medium of claim 13, wherein the designated device comprises a scanning device; and wherein the instructions are executable by the at least one processor of the terminal device to cause the terminal device to further perform identifying a scanning device type based on the first image if the first image is determined to match with the second image.

15. The non-transitory computer-readable storage medium of claim 13, wherein the payment graphic identifier comprises a barcode.

16. The non-transitory computer-readable storage medium of claim 13, wherein the payment graphic identifier comprises a two-dimensional code.

* * * * *